(12) United States Patent
Vaughan et al.

(10) Patent No.: US 10,048,917 B2
(45) Date of Patent: Aug. 14, 2018

(54) REMOTE CONTROL OF A PRESENTATION

(71) Applicant: APPLE INC., Cupertino, CA (US)

(72) Inventors: Paul Bradford Vaughan, Pittsburgh, PA (US); Michael Richard Peirce, Lewis Center, OH (US); Christopher Morgan Connors, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 254 days.

(21) Appl. No.: 15/156,306

(22) Filed: May 16, 2016

(65) Prior Publication Data

US 2017/0010844 A1    Jan. 12, 2017

Related U.S. Application Data

(63) Continuation of application No. 12/345,552, filed on Dec. 29, 2008, now Pat. No. 9,342,231.

(51) Int. Cl.
| | |
|---|---|
| *G06F 3/048* | (2013.01) |
| *G06F 3/14* | (2006.01) |
| *G06F 3/0481* | (2013.01) |
| *G06F 3/0488* | (2013.01) |
| *H04M 1/725* | (2006.01) |
| *G06F 3/0484* | (2013.01) |
| *H04W 88/02* | (2009.01) |

(52) U.S. Cl.
CPC .............. *G06F 3/14* (2013.01); *G06F 3/0481* (2013.01); *G06F 3/0488* (2013.01); *G06F 3/04845* (2013.01); *H04M 1/72533* (2013.01); *H04W 88/02* (2013.01)

(58) Field of Classification Search
CPC .. G06F 3/0481; G06F 3/04845; G06F 3/0488; H04M 1/72533
USPC ......................................................... 715/730
See application file for complete search history.

(56) References Cited

U.S. PATENT DOCUMENTS

| | | | |
|---|---|---|---|
| 6,081,262 A | 6/2000 | Gill et al. | |
| 6,507,865 B1 | 1/2003 | Hanson et al. | |
| 6,910,049 B2 | 6/2005 | Fenton et al. | |
| 7,003,587 B1 | 2/2006 | Battat et al. | |
| 7,007,098 B1 | 2/2006 | Smyth et al. | |
| 7,007,235 B1 * | 2/2006 | Hussein | G06Q 10/10 |
| | | | 715/751 |
| 7,245,660 B2 | 7/2007 | Yona et al. | |
| 7,590,750 B2 * | 9/2009 | Adbo | H04L 29/06027 |
| | | | 709/203 |
| 7,996,436 B2 * | 8/2011 | Schneider | G06F 17/30056 |
| | | | 707/802 |

(Continued)

*Primary Examiner* — David Phantana-angkool
(74) *Attorney, Agent, or Firm* — Fletcher Yoder PC

(57) ABSTRACT

Techniques for remotely controlling a presentation application are disclosed. In accordance with these techniques, a device, such as a handheld device, is linked over a network with a presentation running on a presentation application. In one embodiment, the remote control application allows the presentation to be controlled over the network by direct communication with the presentation application. In certain embodiments, the remote control application displays parts of the presentation, such as a slide being currently presented, and allows navigation of the presentation. In addition, in certain embodiments, the remote control application displays presentation notes, preview slides, or other information useful to a presenter operating the remote control application.

21 Claims, 11 Drawing Sheets

(56) References Cited

U.S. PATENT DOCUMENTS

| | | |
|---|---|---|
| 8,195,768 B2 | 5/2012 | Vaughan |
| 9,928,242 B2 * | 3/2018 | Chaudhary ....... G06F 17/30056 |
| 9,928,376 B2 * | 3/2018 | Vaughan ............. G06F 21/6218 |
| 2002/0083137 A1 | 6/2002 | Rogers et al. |
| 2003/0013483 A1 | 1/2003 | Ausems et al. |
| 2004/0221010 A1 | 11/2004 | Butler |
| 2004/0226047 A1 | 11/2004 | Lin et al. |
| 2004/0230651 A1 | 11/2004 | Ivashin |
| 2004/0230655 A1 | 11/2004 | Li et al. |
| 2004/0230668 A1 | 11/2004 | Carnahan et al. |

* cited by examiner

REMOTE CONTROL OF A PRESENTATION

CROSS-REFERENCE TO RELATED APPLICATIONS

This application is a continuation of U.S. application Ser. No. 12/345,552, filed Dec. 29, 2008 and issued as U.S. Pat. No. 9,342,231, which is hereby incorporated by reference herein in its entirety.

BACKGROUND

1. Technical Field

The present invention relates generally to remotely controlling a presentation.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

One use which has been found for computers has been to facilitate the communication of information to an audience. For example, it is not uncommon for various types of public speaking, (such as lectures, seminars, classroom discussions, keynote addresses, and so forth), to be accompanied by computer generated presentations that emphasize or illustrate points being made by the speaker. Typically, these presentations are composed of "slides" that are sequentially presented in a specified order.

Often these presentations are played on a projector or large display to which the computer is connected. In many instances the presenter stands near the screen or display on which the presentation is displayed, and thus may not be near the computer to control the operation of the presentation application. However, it may be desirable for the presenter to retain control of the presentation application, such as when slides are advanced and so forth, even when not situated near the computer.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

The present disclosure generally relates to techniques for remotely controlling the operation of a presentation application. In one embodiment, the remote control is accomplished using a device, such as a handheld device, capable of communicating over a network with a computer running the presentation application. For example, a cellular telephone or media player having wireless network capabilities may be used to control a presentation application running on a computer on a network.

In implementations where the device used to remotely control the presentation application has a display, the display may be used to show a current slide of presentation. In addition, the display may be used to show information what may normally be available when interacting with the presentation application on the computer but which is not typically displayed to the audience. For example, the display may be used to show a previous or upcoming slide and/or to show presenter notes associated with the current slide.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The application is generally directed to providing remote control of a presentation application. In certain embodiments, the presentation application may be controlled over a network. For example, in one embodiment a handheld device having wireless network capabilities is used to control a presentation application running on a computer on a network. In such an example, the handheld device may display some or all of the same information that may be present on the computer running the presentation application.

Figure 1:
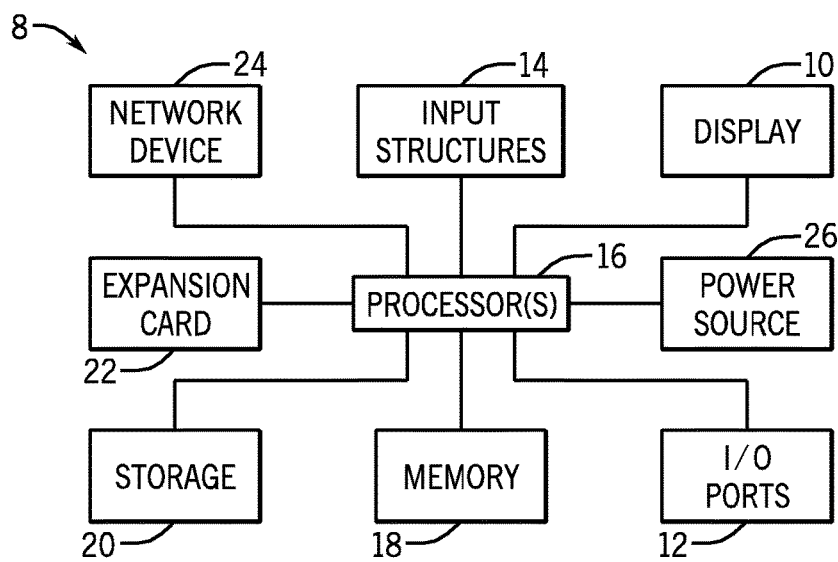
FIG. 1 is a block diagram of exemplary components of an electronic device, in accordance with aspects of the present technique.
Figure 3:
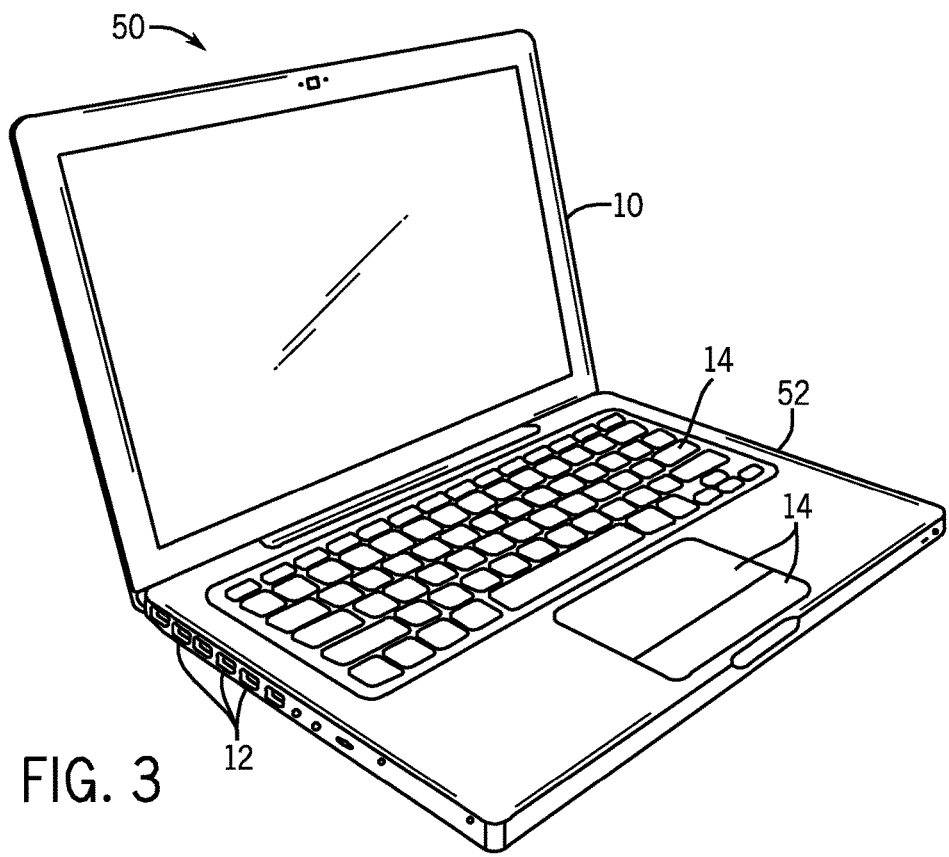
FIG. 3 is a view of a computer for use in accordance with aspects of the present technique.
Figure 2:
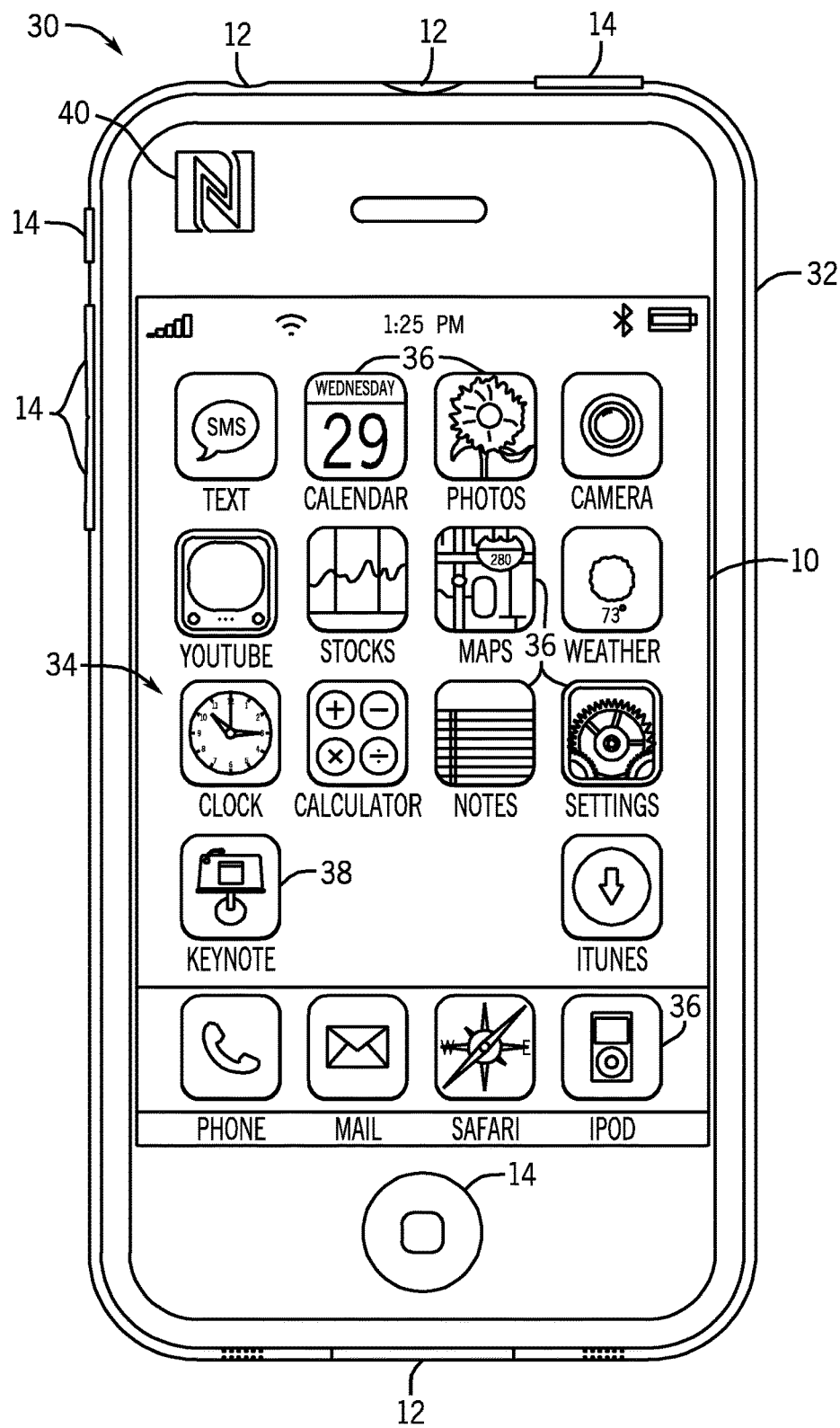
FIG. 2 is a front view of a handheld electronic device in accordance with aspects of the present technique.

With these foregoing features in mind, a general description of suitable electronic devices for implementing aspects of the present techniques are described below. In FIG. 1, a block diagram depicting various components that may be present in electronic devices suitable for use with the present techniques is provided. In FIG. 2, one example of a suitable electronic device, here provided as a handheld electronic device, is depicted. In FIG. 3, another example of a suitable electronic device, here provided as a computer system, is depicted. These types of electronic devices, and other electronic devices providing comparable storage and/or processing capabilities, may be used in conjunction with the present techniques. For example, these and similar types of electronic devices may be used such that a presentation application is run on one device, such as the computer system of FIG. 3, and controlled from another device, such as the handheld electronic device of FIG. 2, in accordance with the teachings of the present disclosure.

An example of a suitable electronic device may include various internal and/or external components which contribute to the function of the device. FIG. 1 is a block diagram illustrating the components that may be present in such an electronic device 8 and which may allow the device 8 to function in accordance with the techniques discussed herein. Those of ordinary skill in the art will appreciate that the various functional blocks shown in FIG. 1 may comprise hardware elements (including circuitry), software elements (including computer code stored on a computer-readable medium) or a combination of both hardware and software elements. It should further be noted that FIG. 1 is merely one example of a particular implementation and is merely intended to illustrate the types of components that may be present in a device 8. For example, in the presently illustrated embodiment, these components may include a display 10, I/O ports 12, input structures 14, one or more processors 16, a memory device 18, a non-volatile storage 20, expansion card(s) 22, a networking device 24, and a power source 26.

With regard to each of these components, the display 10 may be used to display various images generated by the device 8. The display 10 may be any type of display such as a cathode ray tube (CRT), a liquid crystal display (LCD), a light emitting diode (LED) display, an organic light emitting diode (OLED) display, or other suitable display. Additionally, in certain embodiments of the electronic device 8, the display 10 may include a touch-sensitive element, such as a touch screen.

The I/O ports 12 may include ports configured to connect to a variety of external devices, such as a power source, headset or headphones, or other electronic devices (such as handheld devices and/or computers, printers, projectors, external displays, modems, docking stations, and so forth). The I/O ports 12 may support any interface type, such as a universal serial bus (USB) port, a video port, a serial connection port, a IEEE-1394 port, an Ethernet or modem port, and/or an AC/DC power connection port.

The input structures 14 may include the various devices, circuitry, and pathways by which user input or feedback is provided to the processor 16. Such input structures 14 may be configured to control a function of the device 8, applications running on the device 8, and/or any interfaces or devices connected to or used by the electronic device 8. For example, the input structures 14 may allow a user to navigate a displayed user interface or application interface. Examples of the input structures 14 may include buttons, sliders, switches, control pads, keys, knobs, scroll wheels, keyboards, mice, touchpads, and so forth.

In certain embodiments, an input structure 14 and display 10 may be provided together, such an in the case of a touchscreen where a touch sensitive mechanism is provided in conjunction with the display 10. In such embodiments, the user may select or interact with displayed interface elements via the touch sensitive mechanism. In this way, the displayed interface may provide interactive functionality, allowing a user to navigate the displayed interface by touching the display 10.

In one embodiment, the input structures 14 may also include one or more motion sensing devices or other structures suitable for sensing motion (such as changes in the orientation) of the device 8 and generating a suitable input based on the motion. Examples of such devices may include an accelerometer or a gyroscope. In one embodiment, the input structure 14 may be a three-axis accelerometer that includes a sensing element and an integrated circuit interface for providing the measured acceleration and/or motion data to the processor 16. Such a motion sensitive input structure 14 may be configured to sense and measure various types of motion including, but not limited to, velocity, acceleration, rotation, and direction.

User interaction with the input structures 14, such as to interact with a user or application interface displayed on the display 10, may generate electrical signals indicative of the user input. These input signals may be routed via suitable pathways, such as an input hub or bus, to the processor(s) 16 for further processing.

The processor(s) 16 may provide the processing capability to execute the operating system, programs, user and application interfaces, and any other functions of the electronic device 8. The processor(s) 16 may include one or more microprocessors, such as one or more "general-purpose" microprocessors, one or more special-purpose microprocessors and/or ASICS, or some combination of such processing components. For example, the processor 16 may include one or more reduced instruction set (RISC) processors, as well as graphics processors, video processors, audio processors and/or related chip sets.

The instructions or data to be processed by the processor(s) 16 may be stored in a computer-readable medium, such as a memory 18. Such a memory 18 may be provided as a volatile memory, such as random access memory (RAM), and/or as a non-volatile memory, such as read-only memory (ROM). The memory 18 may store a variety of information and may be used for various purposes. For example, the memory 18 may store firmware for the electronic device 8 (such as a basic input/output instruction or operating system instructions), other programs that enable various functions of the electronic device 8, user interface functions, processor functions, and may be used for buffering or caching during operation of the electronic device 8.

The components may further include a computer-readable medium, such as a non-volatile storage 20, for persistent storage of data and/or instructions. The non-volatile storage 20 may include flash memory, a hard drive, or any other optical, magnetic, and/or solid-state storage media. The non-volatile storage 20 may be used to store data files, software (e.g., a presentation application or application for remotely controlling a presentation application), wireless connection information (e.g., information that may enable the electronic device 8 to establish a wireless connection, such as a telephone or wireless network connection), and any other suitable data.

The embodiment illustrated in FIG. 1 may also include one or more card or expansion slots. The card slots may be configured to receive an expansion card 22 that may be used to add functionality, such as additional memory, I/O functionality, or networking capability, to the electronic device 8. Such an expansion card 22 may connect to the device through any type of suitable connector, and may be accessed internally or external to the housing of the electronic device 8. For example, in one embodiment, the expansion card 22 may be flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard or any other suitable wireless networking standard. The network device 24 may allow the electronic device 8 to communicate over a network, such as a Local Area Network (LAN), Wide Area Network (WAN), or the Internet. Further, the electronic device 8 may connect to and send or receive data with any device on the network, such as portable electronic devices, personal computers, printers, and so forth. Alternatively, in some embodiments, the electronic device 8 may not include a network device 24. In such an embodiment, a NIC may be added as an expansion card 22 to provide similar networking capability as described above.

Further, the components may also include a power source 26. In one embodiment, the power source 26 may be one or more batteries, such as a lithium-ion polymer battery. The battery may be user-removable or may be secured within the housing of the electronic device 8, and may be rechargeable. Additionally, the power source 26 may include AC power, such as provided by an electrical outlet, and the electronic device 8 may be connected to the power source 26 via a power adapter. This power adapter may also be used to recharge one or more batteries if present.

With the foregoing in mind, FIG. 2 illustrates an electronic device 8 in the form of a handheld device 30, here a cellular telephone, which may be used store and run routines for remotely controlling a presentation application executing on another platform or device. It should be noted that while the depicted handheld device 30 is provided in the context of a cellular telephone, other types of handheld devices (such as media players for playing music and/or video, personal data organizers, handheld game platforms, and/or combinations of such devices) may also be suitable be provided as the electronic device 8. Further, a suitable handheld device 30 may incorporate the functionality of one or more types of devices, such as a media player, a cellular phone, a gaming platform, a personal data organizer, and so forth.

For example, in the depicted embodiment, the handheld device 30 is in the form of a cellular telephone that may provide various additional functionalities (such as the ability to take pictures, record audio and/or video, listen to music, play games, and so forth). As discussed with respect to the general electronic device of FIG. 1, the handheld device 30 may allow a user to connect to and communicate through the Internet or through other networks, such as local or wide area networks. The handheld electronic device 30, may also communicate with other devices using short-range connections, such as Bluetooth and near field communication. By way of example, the handheld device 30 may be a model of an iPod® or iPhone® available from Apple Inc. of Cupertino, Calif.

In the depicted embodiment, the handheld device 30 includes an enclosure 32 that protects the interior components from physical damage and shields them from electromagnetic interference. The enclosure 32 may be formed from any suitable material such as plastic, metal or a composite material and may allow certain frequencies of electromagnetic radiation to pass through to wireless communication circuitry within the handheld device 30 to facilitate wireless communication.

In the depicted embodiment, the enclosure 32 includes user input structures 14 through which a user may interface with the device. Each user input structure 14 may be configured to help control a device function when actuated. For example, in a cellular telephone implementation, one or more of the input structures 14 may be configured to invoke a "home" screen or menu to be displayed, to toggle between a sleep and a wake mode, to silence a ringer for a cell phone application, to increase or decrease a volume output, and so forth.

A display 10 of the handheld device 30 may be used to display a graphical user interface (GUI) 34 that allows a user to interact with the handheld device 30. The GUI 34 may include various layers, windows, screens, templates, or other graphical elements that may be displayed in all, or a portion, of the display 10. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touch screen included in the display 10, or may be selected by a user input structure 14, such as a wheel or button.

When an icon 36 is selected, the electronic device may be configured to open an application associated with that icon and display a corresponding screen. For example, when the "Keynote" icon 38 is selected, the electronic device may be configured to open an application used to remotely interface with and/or remotely control an instance of a presentation application (such as the Keynote® software package available from Apple Inc.) running on another electronic device available over a network.

The handheld electronic device 30 also may include various input and output (I/O) ports 18 that allow connection of the handheld device 30 to external devices. For example, one I/O port 18 may be a port that allows the transmission and reception of data or commands between the handheld electronic device 30 and another electronic device, such as a computer. Such an I/O port 18 may be a proprietary port from Apple Inc. or may be an open standard I/O port.

In one embodiment, the handheld device 30 may include a near field communication (NFC) device 40. The NFC device 40 may allow for close range communication at relatively low data rates (424 kb/s), and may comply with standards such as ISO 18092 or ISO 21481, or it may allow for close range communication at relatively high data rates (560 Mbps), and may comply with the TransferJet® protocol. In certain embodiments, the communication may occur within a range of approximately 2 to 4 cm. Close range communication with the NFC device 40 may take place via magnetic field induction, allowing the NFC device 40 to communicate with other NFC devices. Such NFC devices 40 may be useful in establishing an initial communication link between the handheld electronic device 30 and another electronic device, such as a computer 50 equipped with a corresponding communication capability. In such embodiments, the NFC device may be the primary communication link between the devices or may merely allow an initial exchange of communication particulars (identifiers, keys, certificates, and so forth) such that a subsequent secure communication link may be established via a different mechanisms, such as over a wireless LAN or cellular network.

In addition to handheld devices 30, such as the depicted cellular telephone of FIG. 2, an electronic device 8 may also take the form of a computer or other types of electronic device suitable for communicating over a network and/or running a presentation application such as the Keynote® software package available from Apple Inc. as part of the iWork® productivity package. Such computers may include computers that are generally portable (such as laptop, notebook, and tablet computers) as well as computers that are generally used in one place (such as conventional desktop computers, workstations and/or servers). In certain embodiments, the electronic device 8 in the form of computer may be a model of a MacBook®, MacBook® Pro, MacBook Air®, iMac®, Mac® mini, or Mac Pro® available from Apple Inc.

By way of example, an electronic device 8 in the form of a laptop computer 50 is illustrated in FIG. 3 in accordance with one embodiment of the present invention. The depicted computer 50 includes a housing 52, a display 10, input structures 14, and input/output ports 12.

In one embodiment, the input structures 14 (such as a keyboard and/or touchpad) may be used to interact with the computer 50, such as to start, control, or operate a GUI or applications running on the computer 50. For example, a keyboard and/or touchpad may allow a user to navigate a user interface or application interface displayed on the display 10.

As depicted, the electronic device 8 in the form of computer 50 may also include various input and output ports 12 to allow connection of additional devices. For example, the computer 50 may include an I/O port 12, such as a USB port or other port, suitable for connecting to another electronic device, a projector, a supplemental display, and so forth.

In addition, the computer 50 may include network connectivity, memory, and storage capabilities, as described with respect to FIG. 1. As a result, the computer 50 may store and execute a GUI and other applications suitable for implementing the present techniques. For example, the computer 50 may be capable of running a presentation application and of communicating with another electronic device over a network to allow remote operation of the presentation application from the other electronic device. Alternatively, the computer 50 may itself be used to remotely control an instance of a presentation application running on another computer on a network.

With the foregoing discussion in mind, it may be appreciated that an electronic device 8 in either the form of a handheld device 30 or a computer 50 may be suitable for running a presentation application or remotely controlling such an application running on another device. Therefore, it should be appreciated that, though specific examples of the use of one type of electronic device or another might be described or discussed herein as running or remotely controlling a presentation application, such discussion is intended as an example only and should not be construed as limiting or as indicative of a preference of one implementation over another. Instead, it should be understood that any suitable electronic device 8 (whether a portable electronic device 30, computer 50, or other type of device) capable of storing data and/or of executing applications as described herein may be used to perform these respective functions in the various implementations described herein.

For example, in one implementation, a presentation application stored and/or executed on a laptop or desktop computer system may be used to display a slideshow presentation via a projector or suitable display. In such an implementation, the computer system may also be connected to a network, such as a LAN, a WAN, the Internet, or some other suitable network implementation, including peer-to-peer networks, client-server networks, and so forth. For example, one suitable network might be a network on which Internet Protocol Suite, i.e., Transmission Control Protocol and Internet Protocol (TCP/IP), are used as the transport and internet layers, respectively. In one such implementation, a device communicating with the computer system over the network may be used to control the presentation application on the computer system.

Figure 4:
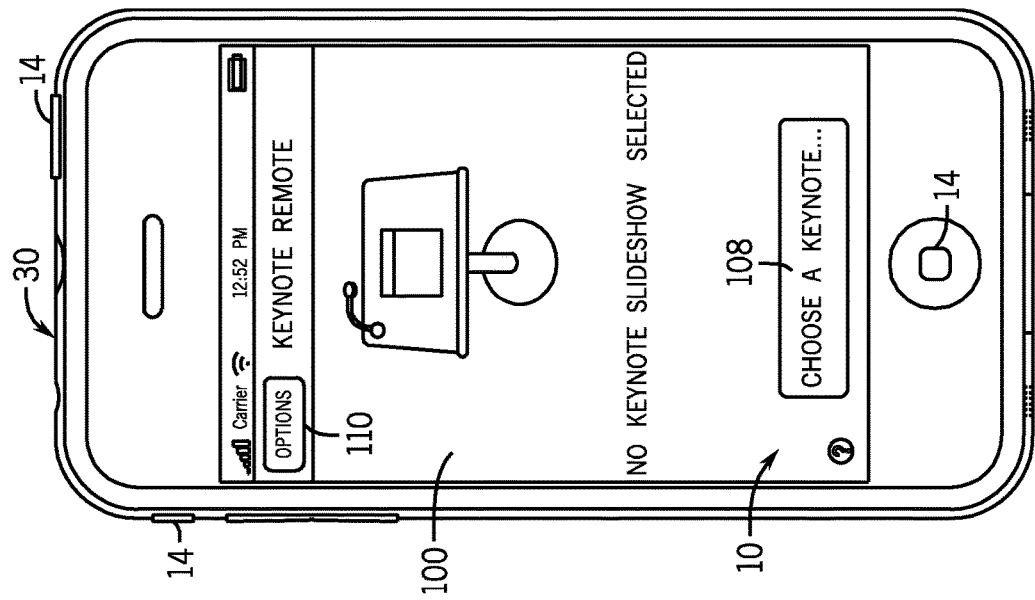
FIG. 4 depicts an example introductory screen of a remote control application, in accordance with one embodiment of the present invention.

For example, referring once again to FIG. 2, a handheld device 30 (such as a cellular telephone or media player) having network capabilities (such as cellular or wireless network connectivity) may be used to connect to and remotely control an instance of a presentation application over a suitable network infrastructure. In the depicted example, an icon 38 may be activated to invoke a remote control application. Once invoked, the handheld device 30 may display an introductory screen 100 (FIG. 4) for the remote control application.

Figure 5:
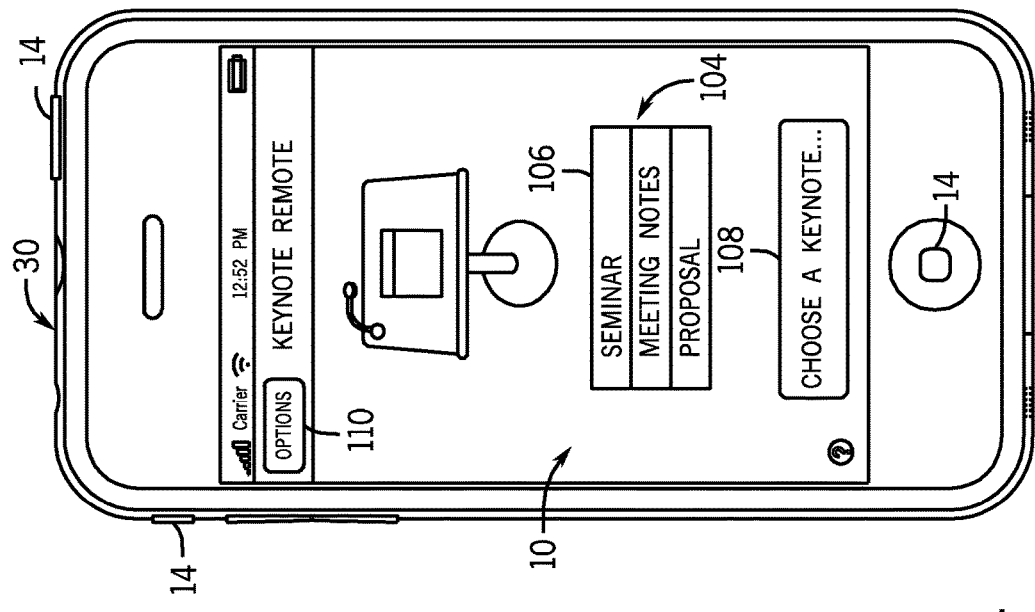
FIG. 5 depicts a further example introductory screen of a remote control application, in accordance with one embodiment of the present invention.

If a presentation has not been previously selected or paired with the remote control application running on the handheld device 30, the introductory screen 100 may indicate that no slideshow presentation is currently selected or available. Conversely, if the remote control application running on the handheld device 30 has previously been linked with instances of presentations currently accessible via the network, the available, previously linked presentations 104 may be displayed for selection of a presentation to remotely control, as depicted in FIG. 5. For example, in the depicted embodiment, the user may select an available presentation for remote control. Such a selection step (and other selection, acknowledgement, and/or interaction steps as discussed herein) may be accomplished by touching the presentation title 106 on the display 10 using a finger or stylus, by manipulating an input structure 14 of the handheld device 30, or by any other suitable mechanism for interacting with and/or selecting options displayed on an interface of an application. In such an embodiment, simply selecting the presentation title 106 may be sufficient to initiate a remote control session of that presentation or the user may, after selection of the presentation title 106, acknowledge the selection via an acknowledgement option 108 displayed on the screen.

Figure 6:
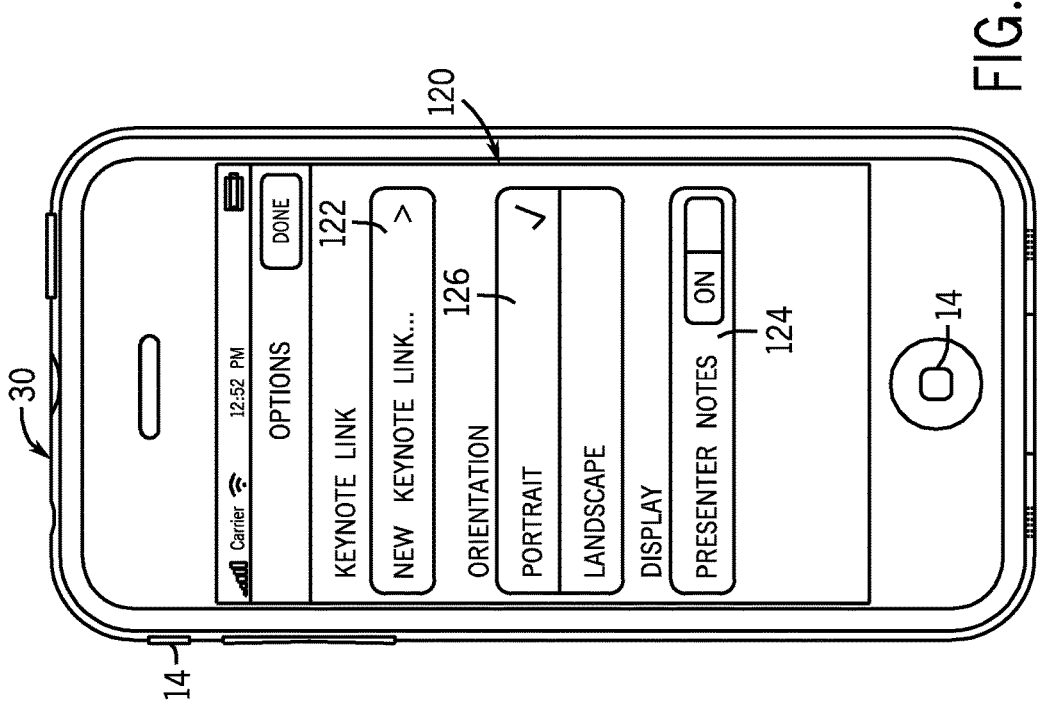
FIG. 6 depicts an example of a settings screen of a remote control application, in accordance with one embodiment of the present invention.

In the event that no previously paired presentation is available or that the desired presentation has not been previously associated with the remote control application on the handheld device 30, a user may desire to establish a pairing or link with a new presentation. In such an instance, the user may select an option 110 such as a "settings" or "options" option, on the introductory screen 100 or the acknowledgement option 108 with no presentation selected. In one such embodiment, a settings screen 120, as depicted in FIG. 6, may be displayed by the remote control application in response to such a selection. In the depicted example, the settings screen 120 may include, among other options, an option 122 to establish a new presentation link.

In one such implementation, selection of the option 122 to establish a new presentation link may result in the remote control application making the handheld device 30 a searchable or locatable resource on a network such that a presentation application running on the network may identify the handheld device 30 as a possible remote control. For example, in one embodiment, a handheld device 30 uses a protocol, such as the Bonjour® protocol available from Apple Inc. to advertise or make itself otherwise locatable to presentation applications on the network.

In such an example, a user of the presentation application running on a computer or other device on the network may identify the handheld device 30 to which a link is to be established. The user may then select the handheld device 30 within the presentation application to link the presentation running in the application and the handheld device 30. The handheld device 30 may then be used to control the presentation, as discussed in greater detail below.

Figure 7:
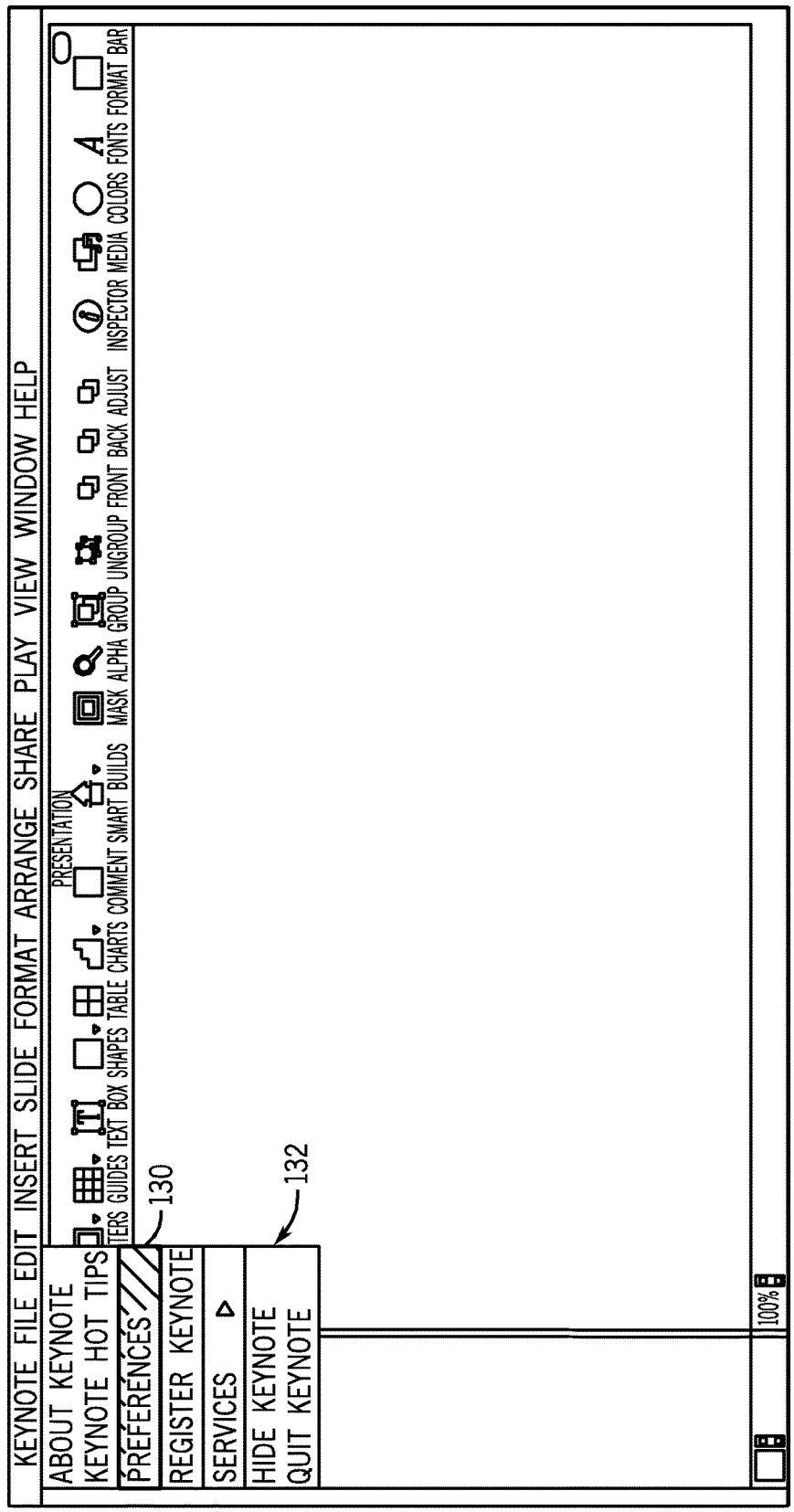
FIG. 7 depicts an example of a screen of a presentation application in preparation of linking to a remotely controlling device, in accordance with one embodiment of the present invention.
Figure 8:
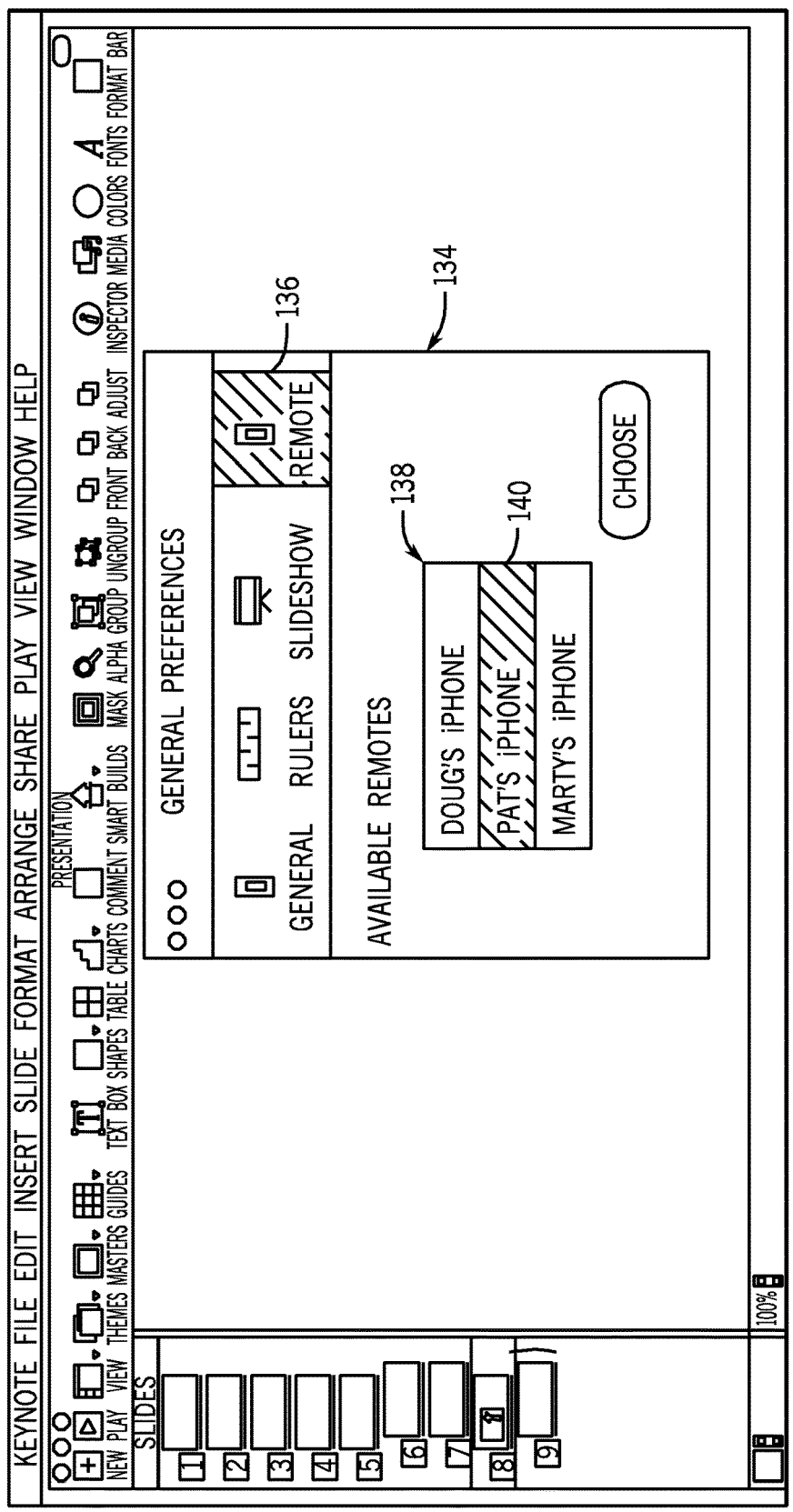
FIG. 8 depicts an example of a screen of a presentation application for selecting a remotely controlling device, in accordance with one embodiment of the present invention.

For example, turning to FIGS. 7 and 8, examples of screens of a presentation application are depicted. In these examples, a user may select a preferences option 130 from a menu 132 to invoke the display of a preferences window 134. From this preferences window 134 the user may select a remote option 136 that displays devices 138 on an available network that are available to link to and remotely control a presentation. The user may then select an available device 140 to establish a link between the open presentation and the linked device 140. Upon acknowledgement of the selection, the linked device 140 may be used to remotely control the presentation, as discussed below, until the link is broken. In one embodiment, the presentation may be linked to only one device at a time which functions as a remote control. In other embodiments, the presentation may be linked more than one device at a time, with each device capable of simultaneously functioning as a remote control.

Figure 9:
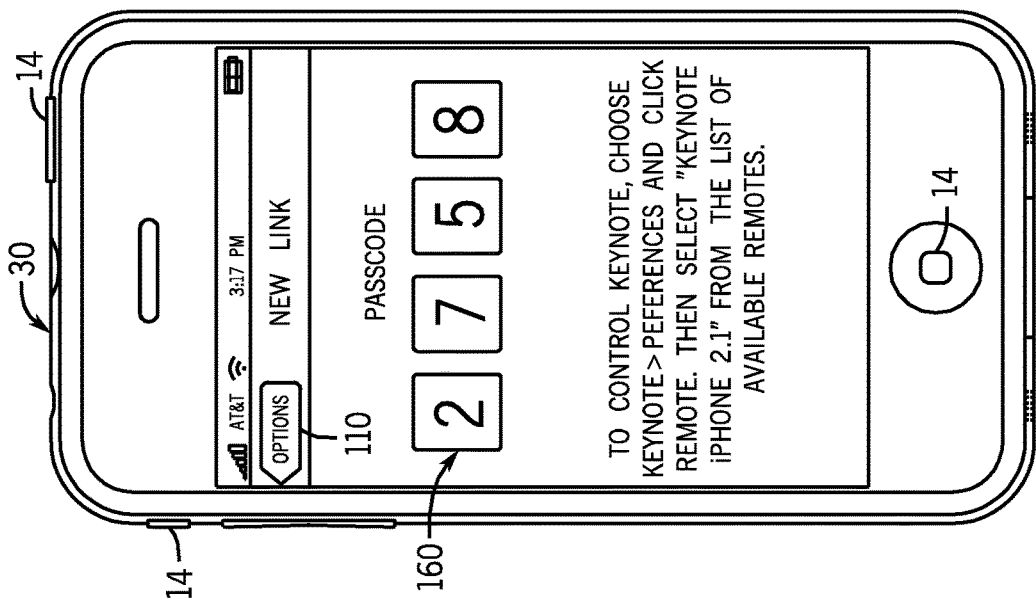
FIG. 9 depicts an example of a passcode screen of a remote control application, in accordance with one embodiment of the present invention.

In certain embodiments, additional security may be provided before a device is allowed to link to and remotely control a presentation. For example, turning to FIG. 9, in one embodiment a passcode 160 may be generated and displayed by a remote control application running on a handheld device 30 advertising itself as a potential presentation remote control on the network. In this example, the presentation application may prompt for entry of this passcode when the device is selected to establish a link to the presentation (FIG. 8). When the passcode is entered, the device is linked to the presentation and may be used to remotely control the presentation until the link is broken.

In certain implementations, the successful linkage of a remote control application running on a handheld or other device and a presentation application may result in a token being stored on one or both devices. For example, such a token may be stored in a preference file located on the device running the remote control application and/or the device running the presentation application. Such a token may be any form of unique identifier, such as an MD5 token or other exchange protocol token, and may be passed between the remote control application and the presentation application as clear or encrypted text. For example, in one embodiment, upon the first successful linkage between a remote control application running on a handheld device and a presentation application running on a computer, the presentation application may transmit as clear text a unique identification token to the remote control application. The remote control application may store this token in a preference file on the handheld device. When a new pairing is attempted with the same presentation application (such as to pair with a new presentation open in the respective presentation application) the remote control application may transmit the token as an identifier, allowing the presentation application to identify the remote control application and/or handheld device based on recognition of the token. While storage of the token on the device running the remote control application is one possibility, in other embodiments, the device running the presentation application may store a unique identification token in addition to or instead of device running the remote control application. In such an alternative embodiment, the device running the presentation application may transmit the token to the remote control application to allow unique identification and recognition of the presentation application.

Thus, in the preceding example, a user of a device, such as a handheld device 30 may select a presentation to remotely control over an available network or may make the device available to be linked to a presentation, which can then be remotely controlled over the network. In this example, the presentation application may be used to identify and select the device on the network as the device that is to be linked to the presentation and used to remotely control the presentation. Linkage between the device and the presentation may be contingent on an additional level of security, such as entry of a passcode generated at the device at the presentation application. In addition, to facilitate future linkages, a token which functions as a unique identifier may be stored on one or both linking devices and exchanged in future communications.

While this example represents one way in which a device and presentation may be linked, it should be appreciated that other techniques may also be employed. For example, the presentation and/or presentation application may instead be advertised or searchable over the network with a handheld device 30 being used to select from available presentations and link to the selected presentation. For example, in one embodiment, a presentation application may be enabled for remote control and once enabled, may advertise itself (or make itself otherwise searchable) on a network using the Bonjour® protocol available from Apple Inc. Once advertised, another device, such as a handheld device, may establish a linkage or take advantage of an existing linkage, to remotely control an application running on the presentation application.

Similarly, a passcode might instead be generated at the presentation application and entered at the potential remote control device. Alternatively, different devices might be assigned different levels of control for a presentation or may be automatically recognized as eligible for linking while other or unknown devices require additional authorization, such as passcode entry. Further, in some embodiments, both presentations and remote control devices may be advertised or searchable over the network, with either the presentation application or the device being able to initiate and establish a linkage with the other, depending on where the linkage action is initiated. Thus, it is to be appreciated that the preceding examples are merely provided by way of illustration and are not intended to be an exhaustive or complete discussion of the manner in which a device and presentation may be linked to establish a remote control relationship.

Figure 10:
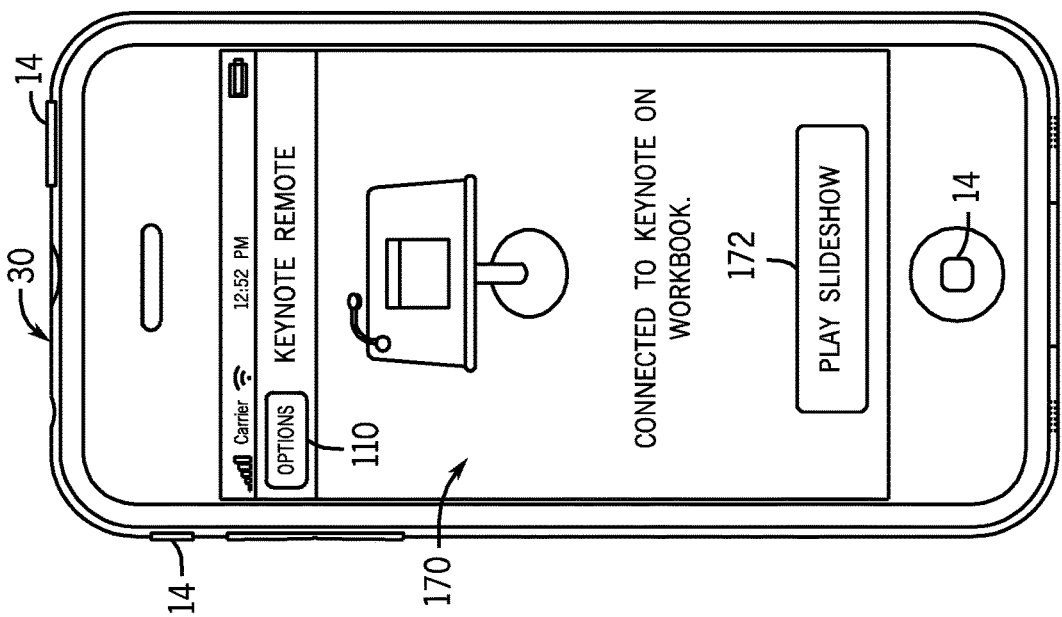
FIG. 10 depicts an example of a start screen of a remote control application, in accordance with one embodiment of the present invention.

Once a device, such as handheld device 30, is linked to a presentation, the device may be used to directly control the presentation via a network connection. For example, referring to FIG. 10, once a presentation is linked to a handheld device 30 or once one of multiple linked slideshows is selected, the remote application on the handheld device may display a play screen 170 having a play option 172 which may be selected by a user to begin the selected slideshow presentation. In one embodiment, the control of the presentation over the network is accomplished by direct communication between the remote application on the handheld device 30 and the presentation application running on the computer. That is, in such an embodiment, the remote control application does not merely emulate keystrokes on the computer running the presentation application, but communicates instructions and/or commands directly to the presentation application.

Figure 11:
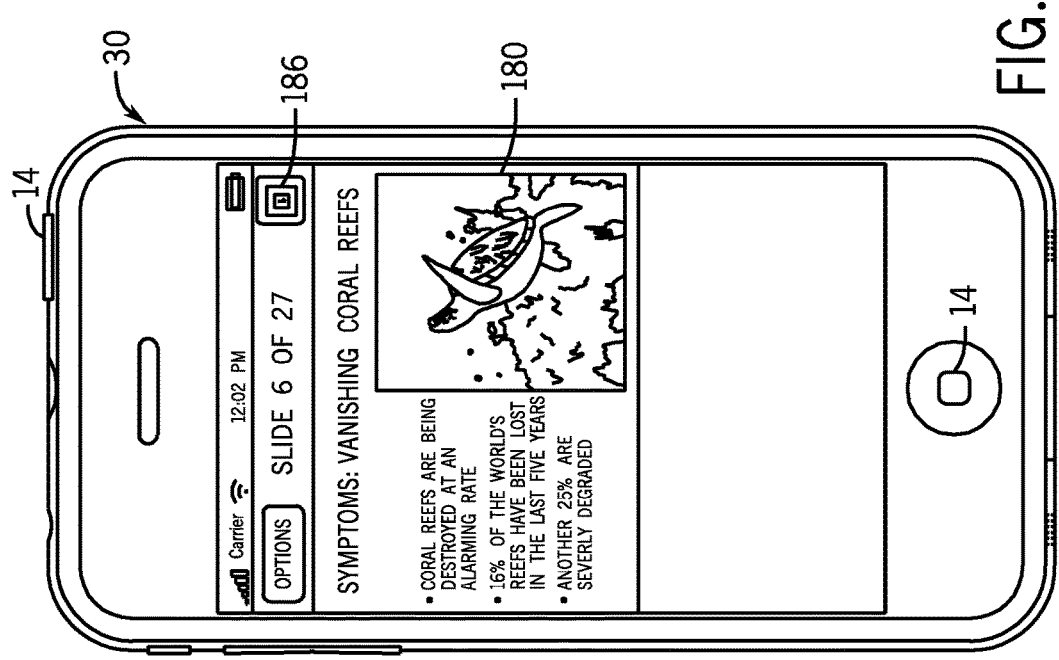
FIG. 11 depicts an example of a presentation screen of a remote control application, in accordance with one embodiment of the present invention.

For example, in one embodiment, once the remote control application and the presentation application are linked, the presentation acts as a server, establishing and maintaining one or more TCP streams with the remote control application throughout the control session. In such an embodiment, once a control session is started, the remote application on the handheld device 30 may display the slides or slide builds 180 of the presentation as they are presented, as depicted in FIG. 11. For example, in one embodiment, presentation data is sent to the remote control application which may include an image file representing a slide or slide build 180 currently displayed by the presentation application at the host device. As will be appreciated such slide builds (such as animation steps) may be used to animate or introduce textual or graphical elements on a slide in incremental or step-wise builds. For example, a slide 180 may list a number of textual elements provided as bullet points, but each bullet point may be introduced as a different build of the slide 180, so that a time interval or user input causes an animation which results in the next build of the slide 180 being displayed. In this way, the slide 180 may be constructed so that it initially appears with a title but no bullet points, then a series of step-wise builds each result in the introduction and display of another bullet point on the slide 180 until the steps are complete and the next slide 180 is displayed. Similarly, a slide 180 may include discrete builds in which one or more graphical or textual elements are animated (moved, rotated, scaled, faded in, faded out, and so forth) at each build. Thus, as used herein, it should be understood that the term slide 180 should be understood as encompassing a slide and any or all of the build permutations of that slide, i.e., the slide after animation build 1, animation build 2, and so forth.

In certain embodiments, the representation generated and displayed at the remote control application may not include video and/or audio components found on the currently presented slide or slide build 180, i.e., the representation is static. In such an implementation a picture or image may be displayed in place of a video on the representation of the slide 180 displayed at the remote control application. Likewise, animation and/or other effects may not be displayed in the static representation displayed at the remote control application. Instead, in such embodiments, a pre-animation slide image and a post-animation slide image may be sent to the remote control application so that the remote control application displays images of the currently presented slide before and after animation with no actual animation being displayed.

For example, in one embodiment, the image data transmitted to the remote control application may be sized and/or formatted for display on the type of device running the remote control application, e.g., a handheld device. Thus, in one such implementation, the transmitted image data may include static images (e.g., .jpg images, .png images, and so forth) of a currently displayed slide or slide build that are sized for display on a handheld device.

In one such an embodiment, the presentation application may include routines for generating .jpg or other static image files of each slide or slide build of the presentation and may transmit the static images to a remote control application in a format suitable for receipt and display by the remote control application. Such images files may be generated on-the-fly, i.e., as needed, or may be generated prior to transmission and cached or otherwise stored for some time interval prior to transmission. For example, the presentation application may include routines used to export image files based on the slides of the presentation and such routines may be used to generate static images files suitable for transmission to and display by a remote control application.

With the foregoing in mind, in one embodiment, the remote application displays a static view of the slide or slide build 180 currently being presented by the presentation application elsewhere on the network. In this manner, a user of the handheld device 30 on which the remote control application is running can view the slide or slide build being presented using the remote control device, even if not physically near the computer on which the presentation application is running. Indeed, in embodiments where the remote control application displays the presently displayed slides, notes and so forth, the presenter may be in an entirely different location from where the slide is being presented and still control the slide presentation via a network connection.

In one embodiment, the presentation application functions as a server to directly serve the presentation data to the remote control application and to receive commands and instructions from the remote control application over the network. For example, during a remote control session at least one TCP stream may be maintained between the presentation application and the remote control application. The initial data requested by the remote control application and/or sent by the presentation application on such a TCP stream may include the number of slides in the presentation, the number of pages (i.e., slides and slide builds) in the presentation, slide notes, and/or the current slide images. In one embodiment, such information may be sent as plain numbers (e.g., number of slides or builds), plain text (e.g., slide notes), and/or standard images (e.g., .jpg or .png files for slide images).

In different embodiments, all of the slide images may be initially sent to the remote control application or only the current slide image may be sent. In other embodiments, a sliding window of images which includes the current slide image and some number of slide images before and following the current slide are sent to the remote control application. In one example of such a window, a current slide image is sent along with the two previous and the four upcoming slide images. This sliding window of images may be cached and updated as the presentation advances, i.e., as the presentation advances the window slides to include a new upcoming slide and to drop the oldest previous slide. In one embodiment, the presentation application, functioning as a server, informs the remote control application of the current slide number or build via an active TCP stream and the remote control application, determines what slide images to display and/or what slide images to request to maintain the sliding window of images. Thus, in such an embodiment, the presentation application provides the remote control application with the status of the presentation and the remote control application determines what data is needed from the presentation application to maintain a current display.

Likewise, in one such an embodiment, the commands sent from the remote control application to the presentation application, such as via a persistent TCP stream, may be the command codes or strings generated recognized by the presentation application, as opposed to keystroke emulations mimicking the pressing of a key at the computer running the presentation application. For example, in one embodiment, the remote control application may send a plain number or character via TCP stream which is recognized by the presentation application as corresponding to a command, such as advance one slide, go back one slide, proceed to next build of current slide and so forth. The presentation application, once it receives such a command code, may proceed to execute the received command.

Figure 12:
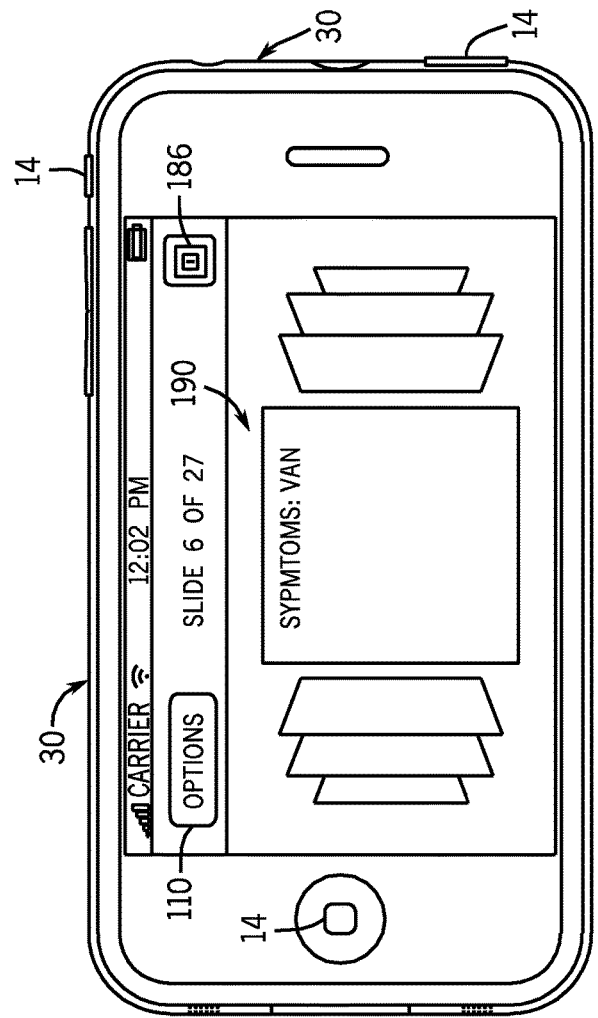
FIG. 12 depicts an example of a presentation screen of a remote control application with presentation commands displayed, in accordance with one embodiment of the present invention.
Figure 13:
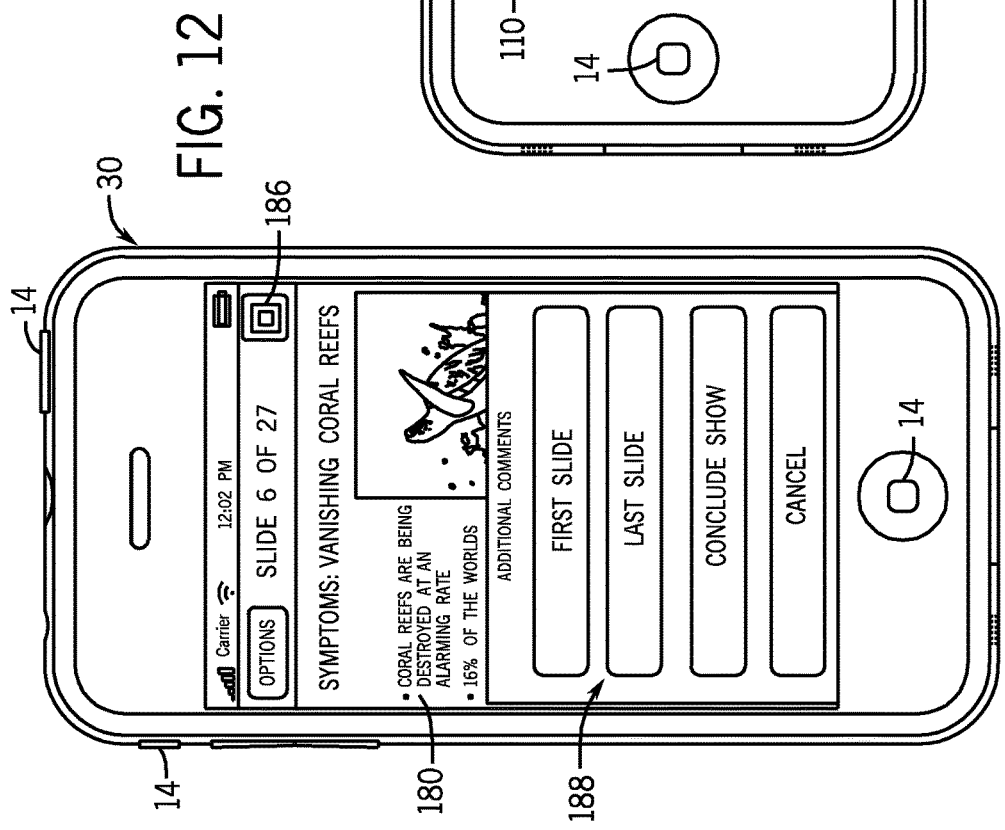
FIG. 13 depicts an example of a presentation screen of a remote control application with multiple slides displayed, in accordance with one embodiment of the present invention.

Because the remote control application may be integrated to communicate directly with the server functionality of the presentation application, a wide array of control options may be available from the remote control functionality, including functions not commonly available by simple keystroke emulation. For example, referring to FIGS. 11-13, selecting an additional commands option 186 on the remote control interface may cause additional command or interface options to be displayed. Such additional commands may invoke the display of one or more settings (FIG. 6) for the remote control application which can be modified or may invoke a list of presentation commands 188, such as options to go to the first slide, the last slide, a slide which may be specified by the user (i.e., slide n), to conclude the presentation, and so forth. Similarly, in certain implementations, a multi-slide or slide carousel type view 190, as depicted in FIG. 13) might also be invoked that may also be used to navigate the presentation.

In one implementation, assuming no additional commands are issued to navigate within the presentation, the user of the remote control may advance the presentation (such as to advance to the next slide or to invoke an animation or change in the current slide) by interacting with the remote control application. For example, in an embodiment in which the remote control application is running on a handheld device 30 having a touchscreen or other touch-sensitive interface, the user may simply tap the present slide to advance the presentation. Similarly, in such a touchscreen or touch-sensitive embodiment, gestures, such as swipes may be used to advance the presentation. For example a swipe instead of a tap may cause the presentation to advance (or recede) by more than one slide. Such a touch-sensitive implementation may be used to navigate a multi-slide or slide carousel type view 190, as depicted in FIG. 13. Alternatively, in embodiments that do not employ a touch-sensitive device, an input structure 14 (such as a click wheel, button, slider, switch, key, knob, scroll wheel, keyboard, mouse, and so forth) of the handheld device 30 may be used to advance one or more slides or to return to previous slides in the presentation.

In addition to displaying the slides of a presentation, in certain embodiments the remote control application may display one or more notes associated with each slide as the slide is displayed. In one embodiment the display of notes may be turned on or off via a control 124 on a settings screen 120 (FIG. 6). As noted previously, in certain embodiments the user may invoke the settings screen 120 at any point in the presentation by selecting an option, such as the additional commands option 186, displayed as part of the remote control interface. In this manner, the user may turn the notes functionality on or off as needed during a presentation.

Figure 14:
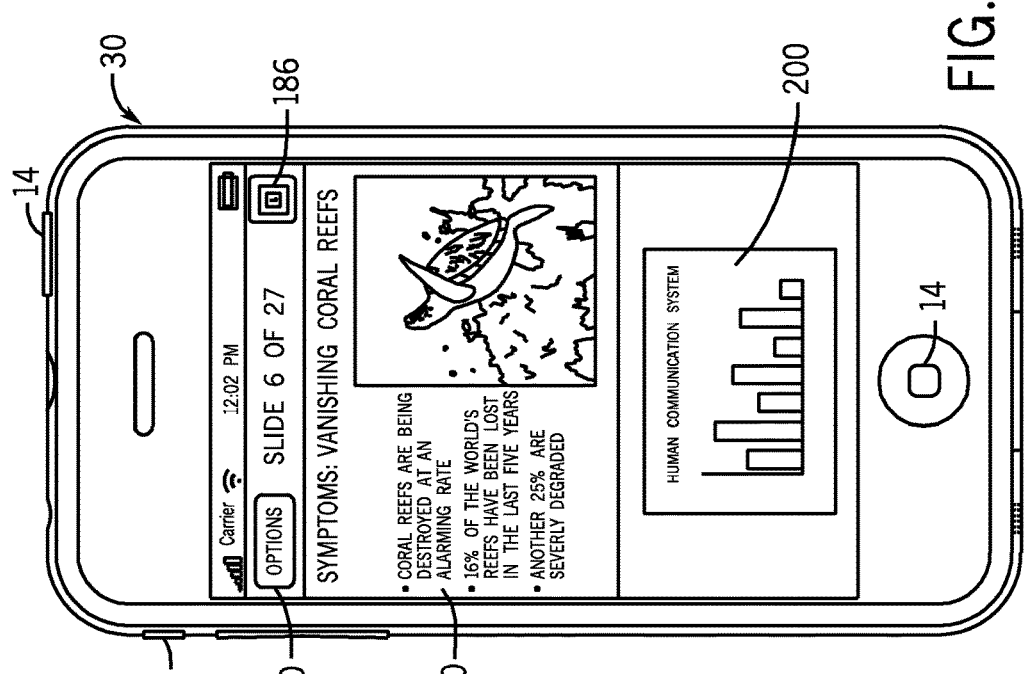
FIG. 14 depicts an example of a presentation screen of a remote control application with presentation notes displayed, in accordance with one embodiment of the present invention.

Turning to FIG. 14, an example of a screen featuring a slide 180 and accompanying notes 196 is depicted. In this example, notes are provided so that they do not overlap the slide 180 on the remote control interface though, in other implementations and depending on space constraints, the notes 196 or the slide 180 may partially or completely overlay the other. In such implementations, a user may be able to alternate which of the notes 196 or the slide 180 are displayed in the foreground, such as by tapping one or the other in a touchscreen embodiment or by interacting with a suitable input structure 14 (button, click wheel, scroll wheel, and so forth) of the device running the remote control application. In one embodiment, when a handheld device 30 running the remote control application is configured to operate in a portrait orientation, the remote control application may default to showing the current slide 180 in the top region of the display and the corresponding notes in the bottom region of the display.

Figure 15:
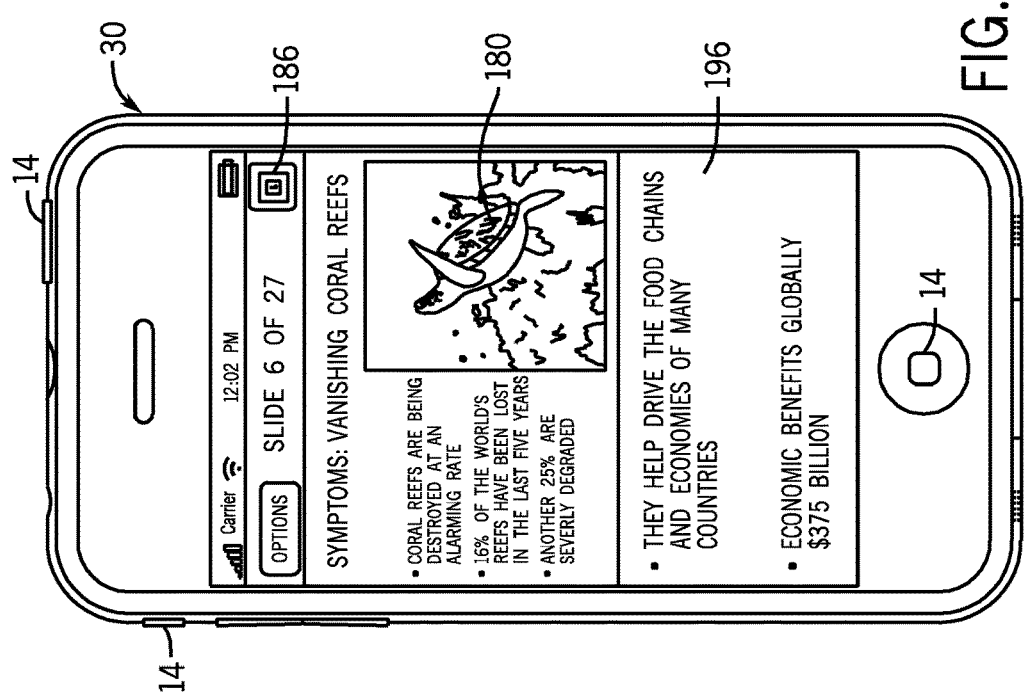
FIG. 15 depicts an example of a presentation screen of a remote control application with a preview slide displayed, in accordance with one embodiment of the present invention.

In addition, in certain embodiments the remote control application may also display a preview slide 200 (typically the next slide in the presentation), as depicted in FIG. 15. In the depicted example, the preview slide 200 may be presented to the right of the current slide 180 to indicate that it is the next slide and may be presented at a reduced size relative to the current slide 180. In other embodiments the preview slide 200 may be presented at other locations relative to the current slide 180, such as beneath the current slide 180 in the display area, and/or may be presented at the same size as the current slide, depending on space constraints of the display area of the device running the remote control application. For example, in one embodiment, when a handheld device 30 running the remote control application is configured to operate in a landscape orientation, the remote control application may default to showing the current slide 180 and the preview slide 200 at the same size and side-by-side. Further, as with the notes 196, the preview slide 200 may be displayed so that the preview slide 200 does or does not overlap the current slide 180. In one implementation in which a preview slide is displayed and the device running the remote control application has a touch sensitive interface, a user may advance the presentation by touching the image of the preview slide on the display 10.

Figure 16:
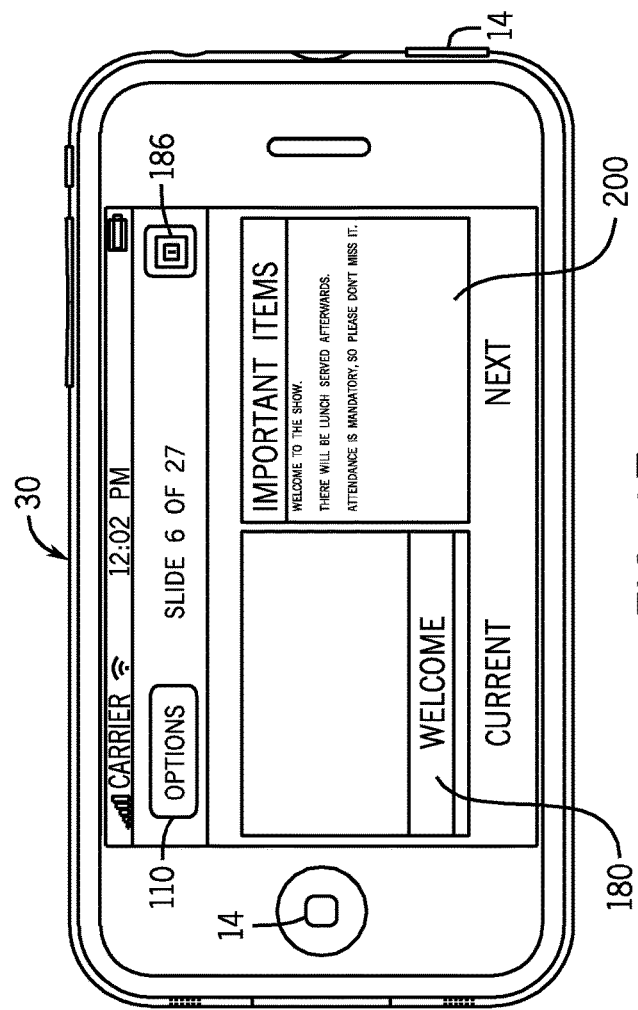
FIG. 16 depicts an example of a presentation screen of a remote control application with presentation notes and a preview slide displayed, in accordance with one embodiment of the present invention.

Turning to FIG. 16, in certain embodiments both a preview slide 200 and notes 196 may be displayed simultaneously with the current slide 180. For example, the preview slide 200 may be displayed at a reduced scale and generally beside the current slide 180 to indicate that is the next slide in the presentation. The remaining available viewing area of the display may be used to display the notes 196 so that a presenter may refer to the notes 196 to discuss the current slide 180. As noted above, in certain implementations, such as where the notes 196 are extensive, the notes 196 may partially or substantially overlap or be overlapped by one or both of the current slide 180 and the preview slide 200. In such implementation, the presenter may select between having the notes 196 or the current slide 180 and preview slide 200 in the foreground.

As noted above, the orientation of the device on which the remote control application runs may be incorporated in to the remote control experience. For example, a handheld device 30 running a remote control application may be usable in either a portrait or landscape orientation. Thus, a presenter may employ such device in either orientation when using a remote control application running on the device.

For example, in one embodiment the presenter may select the desired orientation using an option 126 in a settings screen 120 of the remote control application. In this example the user may invoke the settings screen 120 and interact with the option 126 to set the orientation of the remote control application running on a handheld device 30. In this manner, the user may invoke the settings screen 120 and alter the orientation of the remote control application at any time, including when presenting a slideshow presentation.

In other embodiments, the handheld device 30 may incorporate input structures 14, such as one or more accelerometers or gyroscopes, which are sensitive to motion and may provide an input to adjust the orientation of the remote control application based on user motion. Such an embodiment may also allow a user to adjust the orientation of the remote control application during a presentation if desired. For example, by rotating a handheld device 30 during a presentation, the user may generate an input that changes the orientation of a remote control application running on the handheld device 30 from landscape to portrait or from portrait to landscape.

Figure 17:
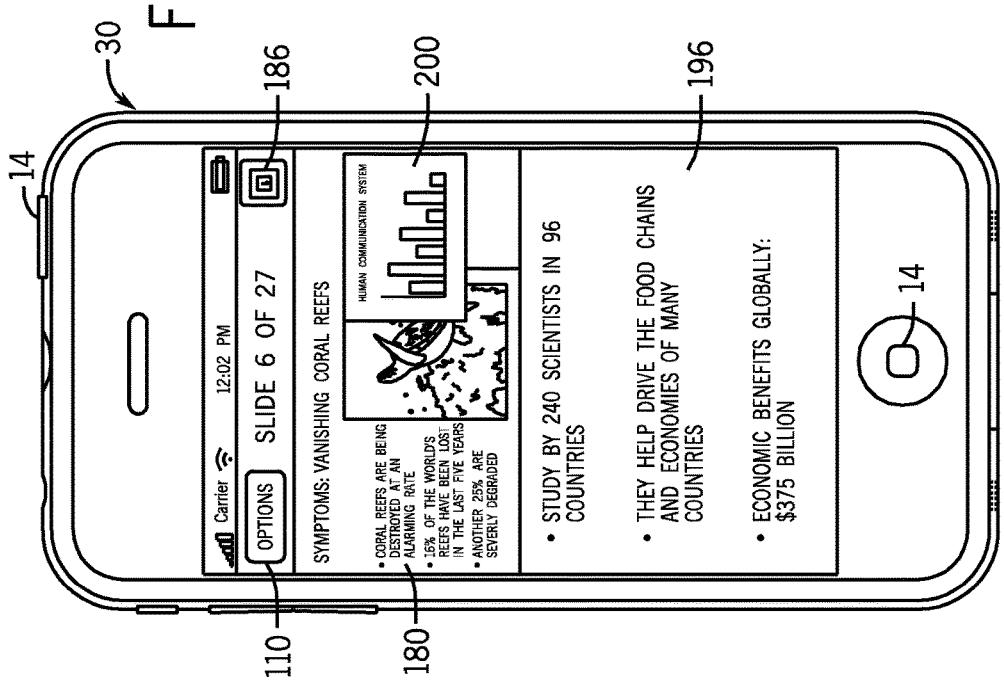
FIG. 17 depicts a further example of a presentation screen of a remote control application with a preview slide displayed, in accordance with one embodiment of the present invention.
Figure 18:
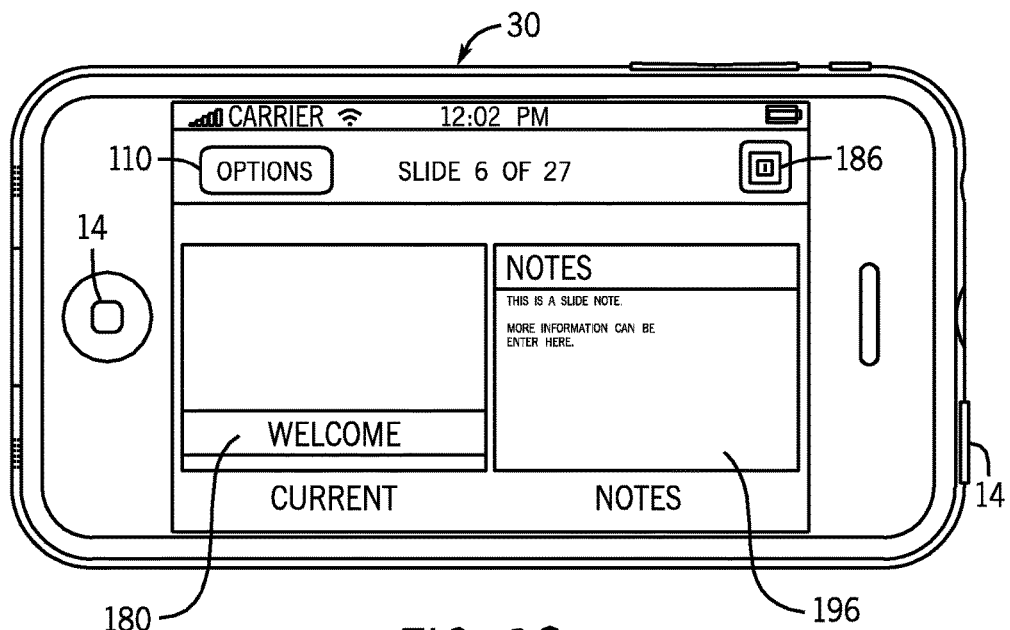
FIG. 18 depicts an additional example of a presentation screen of a remote control application with presentation notes displayed, in accordance with one embodiment of the present invention.
Figure 19:
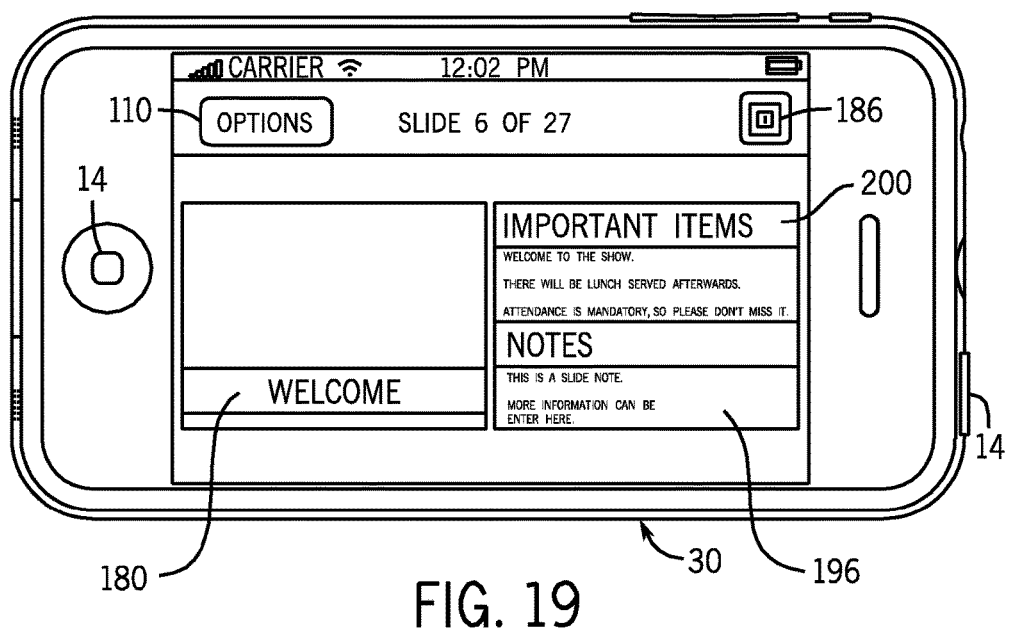
FIG. 19 depicts another example of a presentation screen of a remote control application with presentation notes and a preview slide displayed, in accordance with one embodiment of the present invention.

While the preceding discussion and figures have generally depicted the remote control functionality provided on a handheld device 30 in a portrait orientation, the same functionality may be generally available in a landscape orientation. For example, referring to FIGS. 17-19, examples of a presentation displayed on a remote control application running on a handheld device 30 are depicted. In these examples, different combinations of a current slide 180, a preview slide 200, and notes 196 may be displayed in the landscape orientation and may be viewed and interacted with as previously discussed.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A handheld device comprising:
a display device;
a network device;
one or more processors; and
a storage device including computer-readable instructions that, when executed by the one or more processors, cause the handheld device to perform operations comprising:
interacting with a slideshow presentation application over a network via the network device;
displaying on the display device at least an image of a current slide or slide build of a slideshow presentation playing on the slideshow presentation application;
receiving user inputs related to the play of the slideshow presentation;
transmitting commands corresponding to the user inputs to the slideshow presentation application over the network;
displaying on the display device speaker notes corresponding to the current slide or slide build of the slideshow presentation playing on the slideshow presentation application.

2. The handheld device of claim 1, wherein the storage device includes instructions that cause the handheld device to perform operations comprising: making the handheld device locatable on the network to the presentation application.

3. The handheld device of claim 1, wherein the instructions that cause interacting with the slideshow presentation application include instructions that cause the handheld device to perform operations comprising exchanging a token with the presentation application.

4. The handheld device of claim 1, wherein the storage device includes instructions that cause the handheld device to perform operations comprising:
receiving a token from the slideshow presentation application; and
storing the token for future interactions.

5. The handheld device of claim 1, wherein the storage device includes instructions that cause the handheld device to perform operations comprising: requesting an indication from the slideshow presentation application of the current slide or slide build.

6. The handheld device of claim 5, wherein the storage device includes instructions that cause the handheld device to perform operations comprising: requesting the image based upon the indication of the current slide or slide build.

7. The handheld device of claim 1, wherein the storage device includes instructions that cause the handheld device to perform operations comprising: maintaining a TCP stream with the slideshow presentation application.

8. The handheld device of claim 1, wherein the storage device includes instructions that cause the handheld device to perform operations comprising: displaying an image of an upcoming slide in conjunction with the image of the current slide.

9. The handheld device of claim 1 wherein the storage device includes instructions that cause the handheld device to perform operations comprising:
receiving a sliding window of slide images from which the image of the current slide or slide build is retrieved for display; and
storing the sliding window of slide images.

10. A non-transitory computer-readable medium including one or more sequences of instructions that, when executed by one or more processors, cause the processors to perform operations comprising:
linking to a slideshow presentation application over a network;
receiving at least images of slides of a slideshow presentation from the slideshow presentation application over the network;
displaying a respective image of a slide or slide build being displayed at the slideshow presentation application, wherein the respective image is displayed on a screen of a device on which the slideshow presentation application is not running;
transmitting commands to the slideshow presentation application over the network, wherein the commands control the play of the slideshow presentation by the slideshow presentation application; and
displaying speaker notes corresponding to the current slide or slide build of the slideshow presentation playing on the slideshow presentation application.

11. The computer-readable media of claim 10, wherein the instructions cause exchanging a token with the slideshow presentation application to facilitate linking to the slideshow presentation application.

12. The computer-readable media of claim 10, wherein the instructions cause advertising on the network the availability of a device to serve as a remote control for the slideshow presentation application.

13. The computer-readable media of claim 10, wherein the instructions cause maintaining a TCP stream with the slideshow presentation application.

14. The computer-readable media of claim 10, wherein the instructions cause requesting an indication of the slide or slide build being displayed at the slideshow presentation application.

15. The computer-readable media of claim 10, wherein the instructions that cause receiving at least images of slides of the slideshow presentation includes instructions that cause receiving a sliding window of images.

16. A method comprising:
linking to a slideshow presentation application over a network;
receiving at least images of slides of a slideshow presentation from the slideshow presentation application over the network;
displaying a respective image of a slide or slide build being displayed at the slideshow presentation application, wherein the respective image is displayed on a screen of a device on which the slideshow presentation application is not running;
transmitting commands to the slideshow presentation application over the network, wherein the commands control the play of the slideshow presentation by the slideshow presentation application; and
displaying speaker notes corresponding to the current slide or slide build of the slideshow presentation playing on the slideshow presentation application.

17. The method of claim 16, further comprising: exchanging a token with the slideshow presentation application to facilitate linking to the slideshow presentation application.

18. The method of claim 16, further comprising: advertising on the network the availability of a device to serve as a remote control for the slideshow presentation application.

19. The method of claim 16, further comprising: maintaining a TCP stream with the slideshow presentation application.

20. The method of claim 16, further comprising: requesting an indication of the slide or slide build being displayed at the slideshow presentation application.

21. The method of claim 16, wherein receiving at least images of slides of the slideshow presentation includes receiving a sliding window of images.

* * * * *